United States Patent
Pickard et al.

[11] 3,971,668
[45] July 27, 1976

[54] FORMATION OF LAMINATED GLASS ARTICLES

[75] Inventors: John Pickard, Studley; Richard Melling, Hollywood; Arthur Joseph Nobbs, Alvechurch, all of England

[73] Assignee: Triplex Safety Glass Company Limited, London, England

[22] Filed: Aug. 5, 1974

[21] Appl. No.: 494,866

[52] U.S. Cl. .............................. 156/104; 156/106; 156/312; 156/382
[51] Int. Cl.² ........................................ B32B 31/20
[58] Field of Search .......... 156/102, 103, 104, 105, 156/106, 286, 312, 382, 285

[56] References Cited
UNITED STATES PATENTS

| | | | |
|---|---|---|---|
| 2,992,953 | 7/1961 | Talburtt | 156/382 |
| 3,074,466 | 1/1963 | Little | 156/104 |
| 3,249,479 | 5/1966 | Boicey | 156/104 |
| 3,281,296 | 10/1966 | Jameson | 156/104 |
| 3,347,723 | 10/1967 | Hill | 156/104 |
| 3,532,590 | 10/1970 | Priddle | 156/106 |
| 3,558,415 | 1/1971 | Rieser et al. | 156/106 |
| 3,806,387 | 4/1974 | Peetz et al. | 156/106 |
| 3,852,136 | 12/1974 | Plumat et al. | 156/103 |

*Primary Examiner*—William A. Powell
*Assistant Examiner*—Michael W. Ball
*Attorney, Agent, or Firm*—John P. Snyder

[57] ABSTRACT

In forming a laminated glass article a first stage comprises assembling two glass sheets with an interlayer of thermoplastic transparent plastics material and heating the assembly to a first temperature at which some softening of the plastics material occurs. In the second stage the assembly is heated to a second higher temperature and maintained at the second temperature for a period such that full bonding occurs between the glass sheets and the interlayer, and then cooled, the exposed periphery of the interlayer being maintained at a pressure which is a controlled amount below that applied to the faces of the glass sheets for at least part of the period that the assembly is heated to the second temperature.

13 Claims, 5 Drawing Figures

FORMATION OF LAMINATED GLASS ARTICLES

BACKGROUND OF THE INVENTION

The invention relates to a method for, and apparatus for use in, the manufacture of laminated glass articles.

A laminated glass article may comprise two or more glass sheets with an interlayer of transparent plastics material between each pair of glass sheets. The plastics material is normally thermoplastic and after assembly between the glass sheets is bonded thereto by the application of heat and pressure. Such laminated glass sheet material is commonly used in cases where safety glass is required, such as vehicle windscreens or windows. To achieve a satisfactory laminated product, it is necessary for the glass sheets and plastics interlayer to bond together over the entire area of the glass sheets and for the bonding to be such that in use, delamination does not occur. To achieve this it is necessary for the plastics interlayer to fill the entire space between the glass sheets and for the glass sheets to be drawn together over their whole area during the bonding process. It has previously been proposed in the manufacture of such a laminated glass article to apply reduced pressure to the peripheral edge of the assembly of sheets where the junction between the glass sheets and interlayer is exposed, prior to commencing the bonding action. In a known process the assembly is subjected to ambient pressure and temperature during which stage trapped air is drawn out of the interlayer from between the glass sheets. The assembly is then heated to a temperature at which the interlayer becomes tacky, e.g. 90°C, during which stage further de-airing of the interlayer occurs and a preliminary bonding is brought about between the glass sheets and the interlayer by the glass sheets being drawn together under the ambient external pressure about the trapped interlayer. This has however been a preliminary treatment, called a prenip process, which is carried out as the first stage of a two stage process, the full bonding being effected in the second stage of the process. In the second stage, the glass sheet assembly is further heated to effect proper bonding and is thereafter cooled. In some cases it is desirable to transfer the glass sheet assembly to a suitable pressure vessel for the second stage where the temperature and pressure are raised to carry out the full bonding operation.

SUMMARY OF THE INVENTION

It is an object of the present invention to improve the manufacture of laminated glass sheet articles and reduce the likelihood of unsatisfactory bonding occurring between the plastics interlayer and the glass sheets.

According to the present invention, there is provided a method of forming a laminated glass article comprising two glass sheets with an interlayer of thermoplastic transparent plastics material between the sheets, which method comprises assembling two glass sheets with an interlayer of theroplastic transparent plastics material between them, heating the assembly to an elevated temperature and maintaining the assembly for a period at said elevated temperature whilst subjecting the major faces of the glass sheets to a pressure such that the glass sheets and plastics interlayer become fully bonded together, and cooling the assembly after bonding has occurred, the pressure at the exposed periphery of the interlayer being maintained at a pressure lower than that applied to the faces of the sheets for at least part of the period while the assembly is maintained at said elevated temperature.

The present invention also provides a method of forming a laminated glass article comprising two glass sheets with an interlayer of thermoplastic transparent plastics material between the sheets, which method comprises assembling two glass sheets with an interlayer of thermoplastic transparent plastics material, surrounding the periphery of the assembly with a pressure reduction chamber in sealing engagement with the periphery of the assembly such that the exposed periphery of the interlayer is in communication with the interior of the chamber, heating the assembly to an elevated temperature, maintaining the assembly at said elevated temperature for a period and subjecting the major faces of the glass sheets to a pressure such that the glass sheets and interlayer become fully bonded together, and cooling the assembly after bonding has occurred, the pressure in the interior of the chamber being maintained at a pressure below that applied to the major faces of the sheets so that the sheets are held together with the interlayer and the marginal edges of the sheets are drawn in towards each other, for at least part of the period while the assembly is maintained at said elevated temperature.

The pressure to which the major faces of the sheets are subjected during the bonding process depends upon the plastics material used for the interlayer. When using a material such as polyvinyl-butyral, it is necessary to apply an elevated pressure, that is above atmospheric pressure, while the heating to the maximum temperature takes place. In this case, the pressure at the exposed periphery of the interlayer is also an elevated pressure although lower than the pressure applied to the major surfaces. On the other hand, it is possible to use plastics material such as ethylene copolymer laminating material which can be fully bonded to the glass by heating at atmospheric pressure. In this case, the major surfaces of the glass sheets are maintained at atmospheric pressure during heating while the periphery of the interlayer is held at a controlled negative pressure.

By applying the lower pressure around the peripheral edge of the assembly during the bonding process the glass sheets are held closely in contact with the interlayer and in particular the marginal regions of the glass sheets are squeezed together while the thermoplastic material has softened and bonding is occurring. The lower pressure is preferably applied before the assembly reaches its maximum temperature and may be maintained at least until cooling commences and may be further maintained until cooling is complete. The squeezing together of the edges of the glass sheets has several effects:

a. The interlayer flows laterally from the points of closer spacing of the edges of the glass sheets to the points of greater spacing of the edges of the glass sheets at which points of greater spacing areas of poor bonding would normally tend to occur.

b. There is an outward extrusion of the interlayer from between the edges of the glass sheets which occurs simultaneously with stage (a) above and also subsequently to completion of stage (a).

c. There is a tendency to reduce edge waves in the glass sheets bringing the edges of the glass sheets into a more parallel disposition relative to each other.

The outwards extrusion of the interlayer from between the edges of the glass sheets gives rise to a wedge effect in which the glass sheets taper in towards each other around the periphery of the assembly. The outwards extrusion which occurs up to the completion of stage (a) has to be accepted but further extrusion should be minimised in order to minimise the wedge effect which can give rise to optical distortions at the edges of the assembly.

In a preferred embodiment of the invention the controlled pressure differential is maintained during initial heating of the assembly and whilst the pressure applied to the faces of the glass sheets is being raised. The pressure differential is also maintained when the assembly has reached its maximum temperature and during the period in which the assembly is subjected to full pressure on the faces of the glass sheets. The pressure differential is also preferably maintained whilst the assembly is finally cooled and the pressure is reduced to ensure that the glass sheets and the interlayer remain bonded together.

It may be possible however to apply the pressure differential for only part of the bonding cycle, e.g. for a sufficient period so as to achieve completion of stage (a) above. After completion of stage (a) the further extrusion of the interlayer from between the edges of the glass sheets can be undesirable if it leads to an excessive wedge effect.

For example the differential pressure may be terminated at some time during the period in which the assembly is subjected to the full temperature and pressure i.e. at the point when stage (a) has been completed. However the differential pressure may be applied at some time after commencement of the stage in which the assembly is brought to the full temperature and pressure, the pressure differential being maintained whilst the assembly is held at its maximum temperature and is subsequently cooled and during lowering of the pressure acting on the faces of the glass sheets. Again in this case the differential pressure is applied for a time sufficient to allow the completion of stage (a) as described above.

The above methods involve the application of a constant differential pressure during all or part of the full bonding stage. In another method a varying pressure differential may be applied during the full bonding stage starting, for example, with a small pressure differential at the beginning of the cycle, the differential pressure being increased gradually during the cycle up to a final maximum differential pressure at the end of the bonding cycle. It is thought that this method may have advantages in minimising the amount of extrusion of the interlayer which occurs from between the edges of the sheets thus minimising the resultant wedge effect.

Conveniently the reduced pressure is applied to the marginal edges of the assembly by sealing around the periphery of the assembly a hollow flexible ring into which the marginal region of the assembly projects so as to communicate with the hollow interior of the ring, and connecting the interior of the ring to a controlled pressure supply. Such a ring may be similar to rings previously used to apply reduced pressure to the peripheral regions of a laminated glass assembly during the prenip stage prior to carrying out the subsequent full bonding operation. In this way, the assembly may initially be subjected to the application of vacuum around the periphery of the assembly, as is already known, and the ring maintained in position during the subsequent application of heat and pressure to carry out the bonding operation.

Preferably the glass sheets and interlayer are of the same shape and size when assembled together. It is desirable to avoid using an interlayer which is relatively over-sized in relation to the glass sheets as the projecting edge of the interlayer would tend to fill the interior region of the pressure reduction chamber surrounding the assembly in the bonding operation.

The pressure differential is preferably maintained between 0.14 Kg/cm$^2$ and 1.05 Kg/cm$^2$ and preferably between 0.28 Kg/cm$^2$ and 0.7 Kg/cm$^2$.

In most cases it is desirable for the assembly to be mounted in a closed pressure vessel for the application of heat and pressure to bond the interlayer and glass sheets together. The pressure in said vessel may be raised to 2.0 Kg/cm$^2$ to 14.0 Kg/cm$^2$ depending on the material of the interlayer. Preferably the temperature in said vessel is raised to more than 100°C such as 120°C to 160°C during the bonding operation.

The interlayer preferably comprises a sheet of polyvinyl-butyral although other known transparent thermoplastic laminating materials of similar properties are suitable. In the case of polyvinyl-butyral the pressure in the vessel may be 7.0 Kg/cm$^2$ to 14.0 Kg/cm$^2$ and the temperature is raised to 130°C to 145°C. Alternatively, the interlayer may comprise a sheet of ethylene copolymer laminating material and in this case the external faces of the assembly may be subjected to atmospheric pressure during the full bonding operation in which the temperature may be raised to about 140°C.

The invention includes laminated glass sheet material which may be flat or curved, when made by the aforesaid methods.

The invention also provides a method of forming a laminated glass article comprising two glass sheets with an interlayer of thermoplastic transparent plastics material, which method comprises a first stage of assembling two glass sheets with an interlayer of thermoplastic transparent plastics material, heating the assembly to a first temperature at which at least some softening of the plastics material occurs while applying a subatmospheric pressure to the exposed periphery of the interlayer to remove air from the interlayer, followed by a second stage during which the assembly is heated to a second temperature higher than said first temperature, while the glass sheets are subjected to a suitable pressure, and maintained at said second temperature for a period such that full bonding occurs between the glass sheets and the interlayer, and then cooled, the exposed periphery of the interlayer being maintained at a pressure which is a controlled amount below that applied to the faces of the glass sheets for at least part of the period that the assembly is heated to said second temperature.

The invention also provides apparatus for use in the manufacture of a laminated glass article comprising two glass sheets with an interlayer of thermoplastic transparent plastics material between the sheets, which apparatus comprises a closed pressure vessel for receiving one or more assemblies of glass sheets with an interlayer of thermoplastic transparent plastics material, support means for location within the vessel for supporting one or more said assemblies, said vessel having means for elevating the pressure within the vessel and applying heat to the or each assembly within the vessel to bond the glass sheets and interlayer together, a gas supply passage leading to the interior of the vessel for connection to each assembly for providing an elevated pressure around the peripheral edge of each assembly lower than the elevated pressure in the rest of the vessel, and means for maintaining a controlled pressure differential between the pressure in said gas supply passage and the pressure in the vessel.

DESCRIPTION OF THE PREFERRED EMBODIMENT

Figure 2:
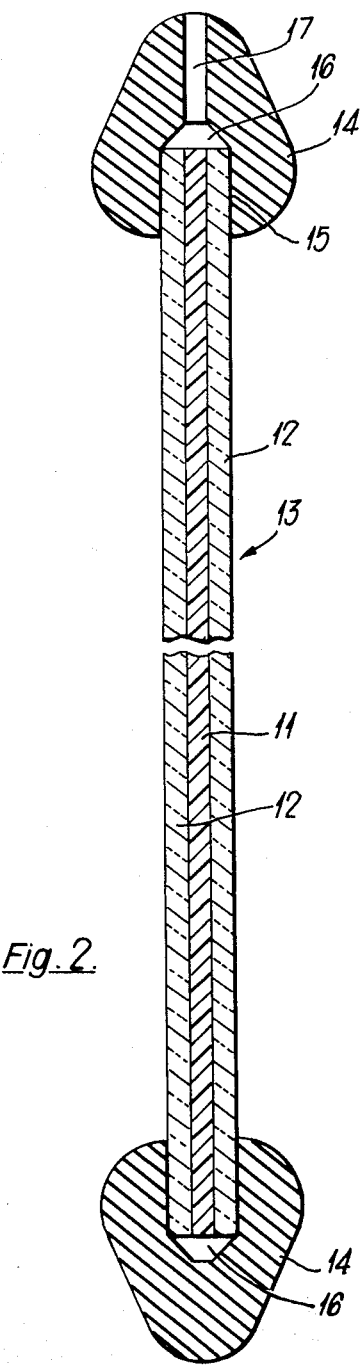
FIG. 2 is an enlarged cross-section through a laminated glass sheet assembly.

This example relates to the manufacture of a laminated glass article comprising two glass sheets with an interlayer of thermoplastic transparent plastics material between the sheets, the particular plastics material used in this case being polyvinyl-butyral. As is shown in FIG. 2, a sheet of polyvinyl-butyral 11 is sandwiched between two glass sheets 12 to form the laminated glass sheet assembly 13. In the manufacturing process, heat and pressure is applied to the assembly to bond the interlayer 11 and glass sheets 12 together. Although the sheets shown in FIG. 2 are flat, the sheets may alternatively be curved and the invention is particularly applicable to the manufacture of laminated windscreens or windows for vehicles. Such windscreens are normally curved particularly towards the marginal regions of the windscreen.

Figure 1:
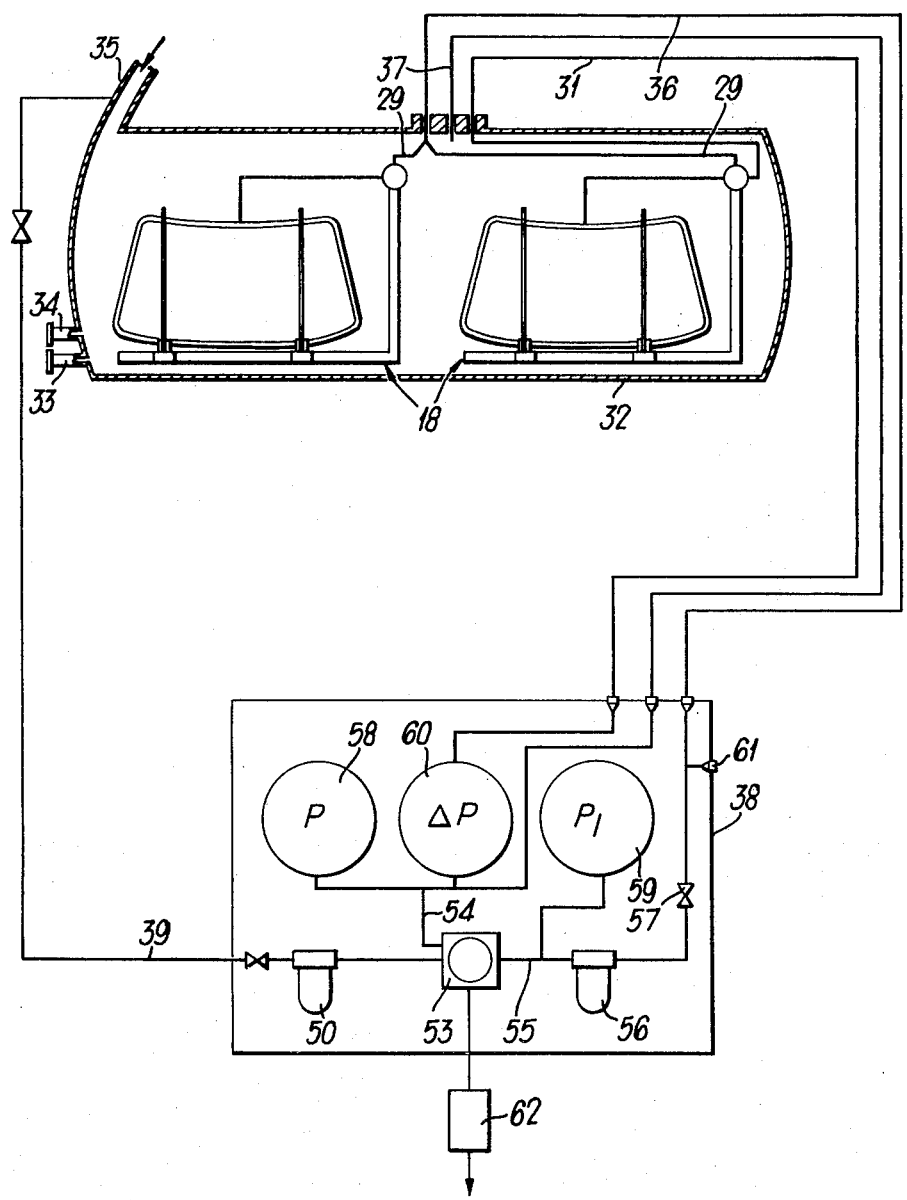
FIG. 1 is a schematic view of one apparatus for use in carrying out the present invention.
Figure 3:
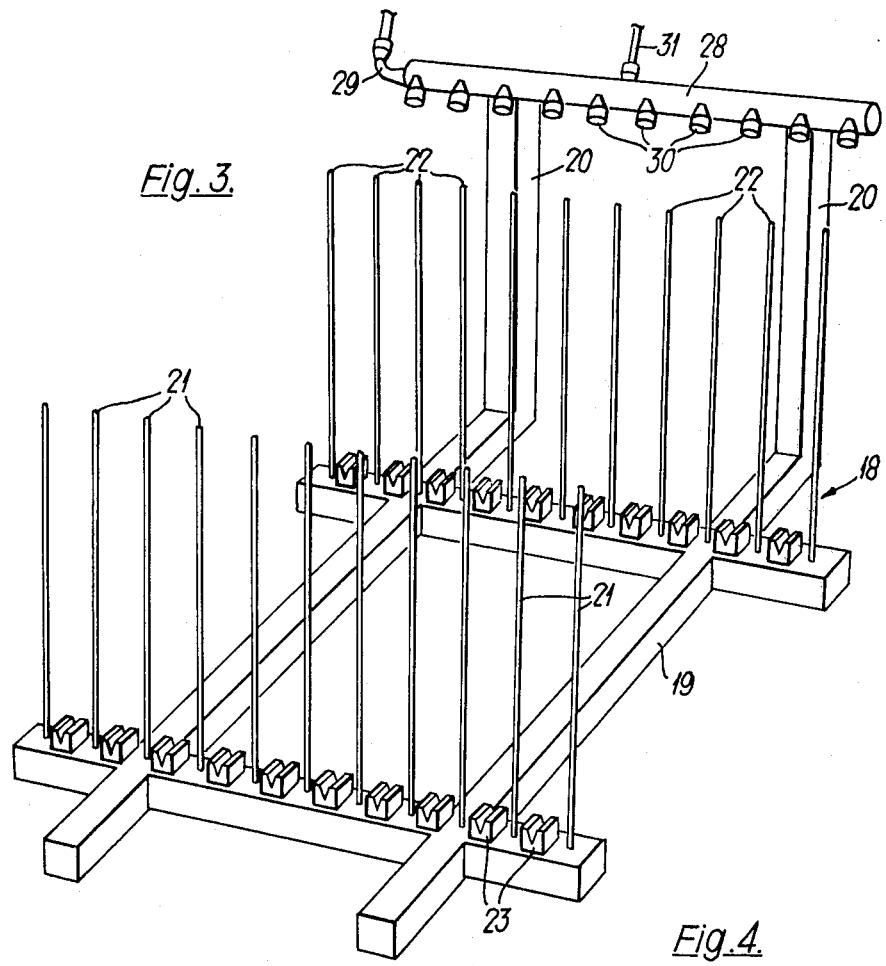
FIG. 3 is a perspective view of part of the apparatus shown in FIG. 1.
Figure 4:
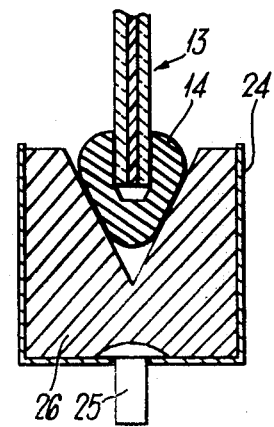
FIG. 4 is an enlarged section through part of the device shown in FIG. 3 with a laminated glass sheet assembly in position.

The manufacturing process will now be described in more detail. The two glass sheets, which are of similar size and mating shape, are assembled together with the layer of polyvinyl-butyral 11 sandwiched between them. The interlayer 11 which may project beyond the sheets 12 is then trimmed flush with the edge of the glass. In accordance with known practice, a pressure reduction chamber in the form of a silicone rubber ring 14 is fitted around the entire periphery of the assembly 13. The ring 14 is formed with a channel 15 into which fits the edge regions of the assembly so that the ring 14 seals against the major face of sheets 12. A hollow annular chamber 16 then extends around the ring in communication with the edge of the assembly where the junction between the sheets 12 and interlayer 11 is exposed. At one position around the ring a vacuum supply passage 17 extends from the hollow chamber 16 to the exterior of the ring and is adapted to be connected to a source of vacuum or other relatively reduced pressure. The assembly is then subjected to a prenip process in which the passage 17 is connected to a source of vacuum so that the hollow chamber 16 is evacuated while the external major faces of the glass sheets 12 are subjected to atmospheric pressure for 10 minutes to ensure de-airation. The whole assembly is then heated to a temperature in the range 90° to 110 C whilst the vacuum is applied. This process causes removal of air from the interlayer and causes the glass sheets 12 to be drawn together into close face-to-face contact with the interlayer sheet 11. The assembly is then allowed to cool and with the ring 14 still in position, the assembly is loaded into a crate 18 of the type shown in FIG. 3. This crate comprises a base frame 19 with two upstanding arms 20 at one end of the crate. Fixed to the base frame 19 are two rows of upstanding support rods 21 and 22. Ten laminated assemblies may be mounted, each in a vertical plane, side-by-side in one crate with one end of each assembly fitting between two supports 21 and the other end of the assembly fitting between two supports 22. A V-shaped mounting block 23 is secured to the base of the crate 18 between each pair of upstanding rods 21 and between each pair of upstanding rods 22. One block is shown in more detail in FIG. 4. The block comprises a rectangular metal casing 24 provided with a pivot pin 25 downwardly projecting from its base. The pin 25 fits into a mating hole in the base frame 19 and allows adjustment of the alignment of the block 23. A silicone rubber V-shaped block 26 fits tightly within the casing 24, the V-shaped channel in the upper part of the rubber block 26 being adapted to engage the tapered external surfaces of the ring 14 when the laminated sheet assembly is in the vertical plane. In this way, the various laminated assemblies are all stacked vertically in the crate 18. Mounted on the upper end of the two arms 20 is a horizontal manifold 28 closed at one end and provided with a self-sealing nozzle 29 which may be subsequently connected to a pressure controlled supply. Ten self-sealing outlet nozzles 30 are provided on the manifold 28 so that each nozzle 30 may be connected by a pipeline to the vacuum supply passage 17 on each rubber ring 14. A pressure sensing line 31 leads from the manifold 28. Before loading the assemblies onto the crate, a vacuum pump is connected to the input 29 of the manifold 28 and the vacuum system is checked for leaks. The laminated assemblies 13 which have been subjected to the prenip process are also checked for vacuum leaks and then each assembly 13 is stacked in the crate and the vacuum passage 17 of each ring is connected to the associated nozzle 30 on the manifold 28. The filled crate is checked for vacuum leaks and two similar crates 18 are then loaded into an autoclave 32 as shown in FIG. 1 through a door (not shown). The autoclave 32 is a normally closed pressure vessel having steam inlet and outlet pipes 33 and 34 to supply steam to heating coils within the autoclave. A compressed air inlet branch 35 leads into the autoclave for pressurising the ambient atmosphere with the autoclave. A second pressure supply line 36, which may be connected to the vacuum pump, also leads into the autoclave and is connected to the inlets 29 of each crate. In this way the pressure supplied along the line 36 is fed to the interior chamber 16 of each ring and is isolated from the ambient pressure within the autoclave. A pressure sensing line 37 passes from the autoclave together with the manifold pressure sensing line 31 and the manifold pressure supply line 36 to a pressure control unit 38.

The pressure control unit 38 enables the ambient pressure within the rings 14 to be controlled thus creating the pressure differential between the pressure in the autoclave and the pressure within the hollow interior 16 of each ring 14. The pressure control unit 38 comprises a compressed air line 39 leading from the inlet branch 35 of the autoclave. The line 39 passes through a valve 40 to a condensation trap 50. Air passing from the trap 50 passes to an adjustable pressure differential control valve 53 arranged to control the difference in pressure between that in the manifold 28 of each crate 18 and the ambient pressure within the autoclave. The valve 53 has an input 54 to which is connected the pressure sensing line 37 leading to the autoclave. The line 37 is connected with a first pressure gauge 58 so as to provide an indication of the pressure being applied in the interior of the autoclave. The valve 53 also has an output 55 which is connected through a further condensation trap 56 and valve 57 to the manifold pressure supply line 36. A second pressure gauge 59 is connected to the output 55 of the valve 53 so as to provide an indication of the pressure being supplied to the manifold 28 of each crate 18 through the line 36. A differential pressure gauge 60 is connected between the line 37 and the line 31 so as to provide an indication of the difference in pressure between the interior of each hollow ring 14 and the ambient pressure within the autoclave.

When the crates 18 have been loaded into the autoclave as shown in FIG. 1, the appropriate connections are made between the lines 31, 36 and the crates 18. The valve 57 is closed and a vacuum line is connected to a vacuum input 61 leading to the line 36. In this way the interior of each ring 14 is evacuated and a check is carried out to see that the system is leak free. The vacuum line which is connected to the input 61 may be provided with a flow-meter which indicates gas flow through the line 36 should any of the rings 14 be leaking. Alternatively leak detection may be by means of a manometer or vacuum gauge in the vacuum line. Once this is done the autoclave is closed and compressed air is fed into the autoclave through the inlet branch 35. When the pressure in the interior of the autoclave has been partially raised the vacuum pump is disconnected from the input 61 and the valve 57 is opened so that a pressure determined by the pressure differential valve 53 is now fed along lines 55 and 36 to each manifold 28 and thereby to the interior of each ring 14. The required pressure differential is set by adjustment of the valve 53 and a flow meter 62 connected to the exhaust of the differential air control valve 53 can be used to check for any leaks in system. If any of the rings 14 are leaking, air at the higher autoclave pressure will feed through the lines 36 and 55 to the valve 53 and will exhaust through the flowmeter 62 giving an indication of the existence of a leaking ring 14. If any leakage is present, the autoclave should be re-opened and the leaking ring 14 corrected. Provided no leaks are found the pressure in the autoclave is increased to maximum pressure which for example may be between 2.0 Kg/cm² and 14.0 Kg/cm². Heating is then commenced by passing steam through the steam inlet pipes 33 into heating coils in the autoclave and using blown air circulation. The temperature is raised to between 120°C and 160°C and is held at for example 135°C for 45 minutes whilst the ambient pressure within the autoclave and the pressure differential are maintained at the required levels. The temperature is then reduced to about 40°C before releasing the pressure within the autoclave and before removing the pressure differential. During the period of increased pressure within the autoclave, the pressure differential set by the valve 53 can be controlled to suite the particular laminated assembly under manufacture and may for example be between 0.14 Kg/cm² and 1.05 Kg/cm² and preferably between 0.28 Kg/cm² and 0.7 Kg/cm². Once the assembly has been cooled to below 40°C, and the pressure released, the autoclave door may be opened and the internal pipework disconnected so that the crates 18 are removed. The heat and pressure treatment within the autoclave causes the plastics interlayer 11 to bond to the glass sheets 12 so that the laminated assemblies can then be removed from the crates 18 each assembly having its component sheets bonded together as a unit.

It is found that by maintaining the pressure differential during the bonding operation, the exposed edge of the polyvinyl-butyral interlayer is subjected to a reduced pressure during the time that the plastics material has softened and the marginal edges of the glass sheets are drawn inwards towards each other in a way which causes the plastics material to extrude and flow outwards into the hollow chamber 16 within each ring 14. On removing the bonded assemblies, the extruded part of the interlayer is removed by trimming with a knife so that in the finished product, no part of the plastics material protrudes beyond the glass sheets. Removal of the extruded portion prevents delamination being initiated by moisture getting into the laminate through the bead or physical damage occurring to it.

It has been found that the extrusion of the plastics interlayer occurs within the peripheral region only of the assembly and a wedge effect occurs in the outer regions of the assembly. In other words, the glass sheets taper in towards each other in the marginal regions of the unit. It is found that for a given differential pressure, a constant wedge effect is obtained for a laminated assembly using a given thickness of glass sheet.

Figure 5:
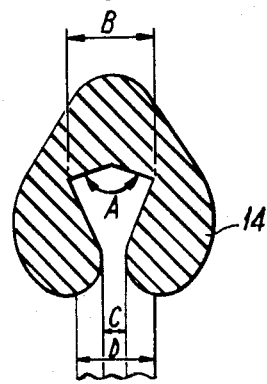
FIG. 5 is a section through a ring for surrounding a laminated assembly.

One particular laminating process will now be described by way of example and in more detail. Two glass sheets are assembled together with a polyvinyl-butyral interlayer to form a glass sandwich assembly. The glass sheets are of either 3 mm. or 2.2. mm. thickness and the polyvinyl-butyral interlayer is of 0.76 mm thickness. A silicone rubber ring 14 of the type shown in FIG. 5 is fitted around the sandwich assembly and vacuum is applied to the interior of the ring for 10 to 15 minutes at room temperature to remove air from the interlayer. Then the assembly is heated to 90° – 100°C within an oven at atmospheric pressure whilst maintaining the vacuum within the ring. This causes the plastics layer to become tacky due to some softening of the plastics material and some preliminary bonding occurs as well as further removal of air from the interlayer. This completes the prenip process, or first stage of the laminating process, and the vacuum is disconnected. With the ring 14 still in position, the sandwich assembly is located in an autoclave crate 18 and positioned in an autoclave for the second stage which effects full bonding between the glass sheets and interlayer. The various connections to the autoclave are made and the ring 14 evacuated once again. The autoclave is pressurised to 1.75 – 2.1 Kg/cm² and at that point the vacuum in the ring 14 is replaced by the required controlled pressure differential $\Delta P$ relative to the pressure in the autoclave. The pressure within the autoclave is then raised to 8.4 Kg/cm² and the temperature is raised to 140°C for 45 minutes while the required pressure differential is maintained. The temperature is then cooled to 40°C while the pressure differential is maintained and finally the pressure in the autoclave is released and the laminated assembly is removed. The results obtained with this example are as follows:

| Example No. | Glass thickness (of each sheet) mm. | ΔP | Wedge effect in mm/50 mm. |
|---|---|---|---|
| 1 | 2.2 | 0.14 Kg/cm$^2$ | 0.03 – 0.05 |
| 2 | 2.2 | 0.35 Kg/cm$^2$ | 0.07 – 0.09 |
| 3 | 2.2 | 0.44 Kg/cm$^2$ | 0.09 – 0.11 |
| 4 | 3 | 0.175 Kg/cm$^2$ | 0.10 – 0.15 |
| 5 | 3 | 0.35 Kg/cm$^2$ | 0.20 – 0.25 |

The amount of wedge obtained in any particular finished laminate is dependent on the parameters
i. Thickness of glass sheets
ii. Thickness and material of interlayer
iii. Design and dimensions of ring 14
iv. Autoclave pressure and temperature
v. Time of autoclaving
vi. Differential pressure applied and time of application.

As the amount of wedge obtained is dependent on the time of application of the differential pressure, it is possible in some cases to reduce the amount of wedge resulting by applying the differential pressure for only part of the period during which the laminated assembly is maintained at the temperature and pressure required for final bonding. For instance in the above example the differential pressure may be applied for the last 30 minutes of the 45 minute period during which the assembly is maintained at the final bonding temperature of 140°C, the differential pressure being maintained during subsequent cooling of the assembly.

The example of silicone rubber ring 14 shown in FIG. 5 is illustrated before fitting onto a sandwich assembly. The angle A is 140°C. When using 3 mm. glass sheet the total thickness D of the glass sandwich is 7 mms. and in this case the dimension B of the ring is also 7 mms. For use with 2.2 mm glass the dimension B may be 5.5 to 6 mms. and the thickness D of the sandwich will be about 5.4 mms. In both cases the opening C is about 2 to 2.5 mms. before fitting onto the glass assembly. The rubber deforms to open up the gap when fitting onto the glass assembly. An important feature of the rings is the inward taper of the side walls before fitting on the laminated assembly. When fitted on the assembly the side walls are flexed to a near parallel configuration, the main sealing being at the inner and outermost points of contact of the side walls of the ring with the glass sheets.

The invention is not limited to the details of the foregoing examples. Instead of using polyvinyl-butyral, it is possible to use ethylene copolymer of the kind described in United Kingdom Patent Specification No. 1,166,443 as the plastics material for the interlayer. In this case it is not necessary to apply above atmospheric pressure to the major faces of the glass sheets to effect full bonding. The process is generally similar to that already described with reference to the use of polyvinyl-butyral except that the second stage in which full bonding occurs need not be carried out in an autoclave. The assembly is subjected to atmospheric pressure during the second stage and the exposed periphery of the interlayer is maintained at a negative pressure which is a controlled amount below the atmospheric pressure applied to the glass sheets. One example using ethylene copolymer material will now be described in more detail. Firstly two glass sheets are assembled together with the ethylene copolymer laminating sheet in between them. In order to carry out the first stage of the process, a rubber ring is fitted around the edges of the assembly as previously described and a vacuum (less than 20 Torr) is applied to the interior of the ring while the assembly is kept at room temperature and pressure. The assembly is then heated in an oven at 120°C at atmospheric pressure for 10 minutes. During this time the vacuum is maintained in the ring. During this stage the interlayer material begins to soften and becomes tacky so that preliminary bonding occurs and due to the application of the vacuum in the ring, further air is removed from the interlayer. At the end of this first stage the assembly need not be cooled for removal of the ring but may be heated to the higher final bonding temperature needed in the second stage of the laminating process. The assembly is heated in an oven at atmospheric pressure to 140°C for 16 minutes and during this time a partial vacuum is applied in the ring so that the pressure at the exposed periphery of the interlayer is maintained below atmospheric pressure and a controlled amount below the atmospheric pressure applied to the major faces of the glass sheets. This pressure differential may be between 0.4 Kg/cm$^2$ and 1.05 Kg/cm$^2$ and is preferably between 0.28 Kg/cm$^2$ and 0.7 Kg/cm$^2$. The pressure differential may be applied for the whole of the heating operation in the second stage or it may be applied for only the initial part of the heating process or at some time after the beginning of the heating process for example for the last eight minutes of the 16 minute heating period referred to above. The assembly is then allowed to cool to 40°C or even room temperature and the partial vacuum, if it is being applied at the end of the heating stage, is preferably maintained in the ring during the full cooling stage. The ring is then removed and the assembly reheated to 100°C and then quenched in water at 50°C. This quenching operation avoids the formation of haze in the interlayer material.

As referred to above the differential pressure may be applied for only the initial part of the heating process, for instance during the first 8 minutes of the 16 minute period during which the assembly is maintained at 140°C in the above example. In this case after completion of the initial 8 minute period during which the differential pressure is applied, the assembly is then cooled to 40°C or room temperature for removal of the ring from the assembly. The differential pressure is preferably maintained during this cooling. After removal of the ring from the assembly it is then re-heated to 140°C for the remaining 8 minutes of the heating period. The assembly is then cooled to 100°C for quenching in water at 50°C.

It will be appreciated that in all the above examples the controlled pressure differential between the exposed periphery of the interlayer and the major faces of the sheets is applied throughout the critical portion of the full bonding operation. That is the period at which the assembly is at its hottest temperature for full bonding so that the effect of the pressure differential is achieved while the plastics material is in its softest condition.

When using the autoclave 32, described with reference to FIG. 1 it is possible to mount the laminated assemblies on the crates 18 and locate the crates within the autoclave before carrying out the prenip process. In this case, the sheet assemblies are assembled in the usual way, the rings 14 are located in position around each assembly and these in turn are placed in the crates 18. Once located in the closed autoclave, vacuum is applied to the rings 14 at room temperature and pressure for 10 minutes. The pressure within the chamber is then increased to 2.1 Kg/cm² and the heating operation is started. The vacuum applied to the rings 14 is replaced by the required differential pressure when the chamber temperature has reached about 90°C. The chamber pressure is then increased to the maximum such as 8.4 Kg/cm², as previously described and the rest of the cycle is continued as previously described.

It has been found that by maintaining a relatively reduced pressure on the edge of the laminated assembly where the junction of the glass sheets and interlayer is exposed, during the application of heat to carry out full bonding, better lamination occurs between the glass sheets and the interlayer. The above described examples result in improved lamination particularly in the case of curved windscreens where the extrusion effect of the plastics interlayer has overcome some problems which otherwise result from minor mis-match between the two glass sheets particularly in the edge regions of the sheets. In this way, a higher yield of good laminated windscreens or windows is provided.

We claim:
1. A method of effecting final bonding between two glass sheets with an interlayer of thermoplastic transparent plastics material between the sheets comprising the steps of:
   a. providing an assembly of two glass sheets with an interlayer of thermoplastic transparent plastics material between them;
   b. heating the assembly to an elevated temperature sufficient to render said material flowable and maintaining such temperature for a selected period of time;
   c. subjecting the major faces of the sheets to a pressure in excess of atmospheric pressure during said selected period of time such that the glass sheets and interlayer become fully bonded together;
   d. subjecting the exposed periphery of the interlayer at the edges of the sheets during said selected period of time to a pressure in excess of atmospheric pressure but lower than that applied to the faces of the sheets by an amount sufficient to provide a pressure differential between the pressures of steps (c) and (d) which is in the range of 0.14 Kg/cm² to 1.05 Kg/cm², said lower pressure being maintained at the exposed periphery of the interlayer for at least part of the period while the assembly is maintained at said elevated pressure and temperature; and
   e. cooling the assembly after full bonding has occurred.

2. A method according to claim 1 in which the glass sheets and interlayer are of the same shape and size when assembled together.

3. A method according to claim 1 in which the assembly is mounted in a closed pressure vessel for the application of heat and pressure to bond the interlayer and glass sheets together.

4. A method according to claim 1 in which the interlayer comprises a sheet of polyvinyl-butyral.

5. A method according to claim 3, in which the pressure in said vessel is raised to 2 Kg/cm² to 14 Kg/cm².

6. A method according to claim 3, in which the temperature in said vessel is raised to more than 100°C, such as 120°C to 160°C.

7. A method of effecting final bonding between two glass sheets with an interlayer of thermoplastic transparent plastic material between the sheets consisting of the steps of:
   a. providing a de-aerated and partially bonded assembly of two glass sheets with an interlayer of thermoplastic transparent plastics material;
   b. surrounding the periphery of the assembly with a pressure reduction chamber in sealing engagement with the periphery of the assembly such that the exposed periphery of the interlayer is in communication with the interior of the chamber;
   c. heating the assembly to an elevated temperature sufficient to render said material flowable;
   d. subjecting the major faces of the sheets to a pressure in excess of atmospheric pressure during said selected period of time such that the glass sheets and interlayer become fully bonded together;
   e. maintaining a pressure in the chamber which is in excess of atmospheric pressure but below that applied to the major faces of the sheets by an amount sufficient to provide a pressure differential between the pressures of steps (d) and (e) which is in the range of 0.14 Kg/cm² to 1.05 Kg/cm² so that the sheets are held together with the interlayer and the marginal edges of the sheets are drawn in towards each other for at least part of the period while the assembly is maintained at said elevated pressure and temperature; and
   f. cooling the assembly after bonding has occurred and maintaining the pressure differential of step (e) during at least the commencement of such cooling.

8. A method according to claim 7, in which prior to applying heat to effect full bonding, the pressure in the hollow chamber is reduced below atmospheric pressure.

9. A method according to claim 8, in which some heat is applied to the assembly while the pressure in the hollow chamber is maintained below atmospheric pressure.

10. A method according to claim 8, in which some increase in pressure on the major faces of the glass sheets is effected before the pressure within the chamber is raised to atmospheric pressure or higher.

11. In the method of forming a laminated glass article, the steps of:
   a. assembling two glass sheets with an interlayer of thermoplastic transparent material between them;
   b. de-aerating and partially bonding the assembly of step (a);
   c. heating the assembly of step (b) to an elevated temperature sufficient to render said material thermoplastic and maintaining such temperature for a selected period of time sufficient to permit bonding of the glass sheets to the interlayer;
   d. during step (c), subjecting the major faces of the glass sheets to a first pressure while subjecting the periphery of the assembly to a second pressure, said first and second pressures each being greater than atmospheric and being selected such that the second pressure is lower than the first pressure and presents a pressure differential within the range 0.14 Kg/cm² to 1.05 Kg/cm²; and then
   e. cooling said assembly while maintaining said pressure differential during at least commencement of such cooling.

12. A method according to claim 11, in which the pressure differential is maintained at least during the latter part of the period while the assembly is maintained at said elevated temperature and being maintained during subsequent cooling of the assembly.

13. In the method as defined in claim 11 wherein said pressure differential is maintained in the range 0.28 Kg/cm² to 0.7 Kg/cm².

* * * * *